United States Patent
Willobee et al.

(10) Patent No.: US 10,059,242 B1
(45) Date of Patent: Aug. 28, 2018

(54) VEHICLE FLOOR MAT ASSEMBLY

(71) Applicants: Barbara J Willobee, Lake Orion, MI (US); Michael S Sullivan, Washington, MI (US); Thomas Haberkamp, Rochester Hills, MI (US)

(72) Inventors: Barbara J Willobee, Lake Orion, MI (US); Michael S Sullivan, Washington, MI (US); Thomas Haberkamp, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/590,450

(22) Filed: May 9, 2017

(51) Int. Cl.
*B60N 3/04* (2006.01)
*B60R 15/00* (2006.01)
*B60R 11/00* (2006.01)

(52) U.S. Cl.
CPC ............. *B60N 3/048* (2013.01); *B60N 3/046* (2013.01); *B60R 15/00* (2013.01); *B60N 3/04* (2013.01); *B60R 2011/0029* (2013.01)

(58) Field of Classification Search
CPC .......... B60N 3/04; B60N 3/046; B60N 3/048
USPC ......................................... 296/97.23; 15/215
See application file for complete search history.

(56) References Cited

U.S. PATENT DOCUMENTS

| | | | |
|---|---|---|---|
| 2,650,855 A | 9/1953 | Peirce | |
| 3,337,258 A | 8/1967 | Steinberg | |
| 3,488,081 A | 1/1970 | Nolen | |
| 4,765,670 A | 8/1988 | Jackson | |
| 5,149,572 A | 9/1992 | Gaggero et al. | |
| 5,830,560 A | 11/1998 | Koa | |
| 6,361,099 B1 | 3/2002 | McIntosh et al. | |
| 6,817,649 B1 | 11/2004 | Stanesic | |
| 7,648,187 B2 | 1/2010 | Hoffman et al. | |
| 8,163,369 B2 | 4/2012 | Stanesic et al. | |
| 9,796,311 B2 * | 10/2017 | Veik | B60N 3/046 |
| 2005/0247000 A1 * | 11/2005 | Zhu | E04F 13/08 52/588.1 |
| 2007/0087163 A1 * | 4/2007 | Lasly | B60N 3/048 428/131 |
| 2017/0280908 A1 * | 10/2017 | Huang | A47G 27/0293 |

* cited by examiner

*Primary Examiner* — Dennis H Pedder
(74) *Attorney, Agent, or Firm* — Ralph E. Smith

(57) ABSTRACT

A floor mat assembly includes an extended floor mat and a connecting floor mat. The extended floor mat includes a floor portion and an extension portion. The extension portion includes a plurality of apertures and a plurality of tabs. The connecting floor mat includes a floor portion, an extension portion, and an adaptor member. The extension portion of the connecting floor mat extends from the floor portion. The adaptor member extends from the extension portion and includes a plurality of apertures and protrusions. The extended floor mat and the connecting floor mat interlock when the plurality of tabs of the extended floor mat extend through the plurality of apertures of the adaptor member and the protrusions of the adaptor member extend through the plurality of apertures of the extended floor mat to restrict vertical and lateral movement of the extended floor mat and connecting floor mat relative to each other.

8 Claims, 7 Drawing Sheets

VEHICLE FLOOR MAT ASSEMBLY

FIELD

The present disclosure relates to a vehicle floor mat assembly.

BACKGROUND

This section provides background information related to the present disclosure and is not necessarily prior art.

A floor mat can include a single, unitary body that extends across a row of a vehicle and is disposed on a floor of the vehicle. The floor mat collects fluids and debris, for example, thereon so that they are not spilled onto the floor of the vehicle. However, the cumbersome size of the floor mat often leads to difficulty installing and removing the floor mat into and from the vehicle. Furthermore, the cumbersome size of the floor mat also leads to inadvertently spilling fluid and debris thereon onto the floor of the vehicle when a user attempts to remove the floor mat from the vehicle. The teachings of the present disclosure provide a floor mat assembly that is conveniently installed into and removed from the vehicle, and avoids inadvertent fluid and debris spills onto the floor of the vehicle when the floor mat assembly is removed from the vehicle.

SUMMARY

This section provides a general summary of the disclosure, and is not a comprehensive disclosure of its full scope or all of its features.

In one form, a floor mat assembly is configured to at least partially cover a floor of a vehicle. The floor mat assembly includes an extended floor mat and a connecting floor mat. The extended floor mat includes a floor portion and an extension portion. The extension portion extends from the floor portion and includes a plurality of apertures and a plurality of tabs at a periphery thereof. The plurality of tabs extend outwardly from the extension portion. The connecting floor mat includes a floor portion, an extension portion, and an adaptor member. The extension portion of the connecting floor mat extends from the floor portion. The adaptor member is integrally attached to the extension portion of the connecting floor mat and includes a plurality of apertures and protrusions that extend therefrom. The extended floor mat and the connecting floor mat interlock when the plurality of tabs of the extension portion of the extended floor mat extend through the plurality of apertures of the adaptor member and the protrusions of the adaptor member extend through the plurality of apertures of the extension portion of the extended floor mat to restrict vertical and lateral movement of the extended floor mat and the connecting floor mat relative to each other.

In some configurations, the plurality of apertures and the plurality of tabs of the extension portion of the extended floor mat alternate relative to each other.

In some configurations, the plurality of apertures and the protrusions of the adaptor member alternate relative to each other.

In some configurations, the extension portion of the extended floor mat extends upward from the floor portion of the extended floor mat, and wherein the extension portion of the connecting floor mat extends upward from the floor portion of the connecting floor mat.

In some configurations, the plurality of tabs of the extended floor mat lock against the extension portion of the connecting floor mar once the extended floor mat and the connecting floor mat interlock to restrict vertical movement relative to each other.

In some configurations, the adaptor member of the connecting floor mat locks against the extension portion of the extended floor mat once the extended floor mat and the connecting floor mat interlock to restrict vertical movement relative to each other.

In some configurations, the extension portion of the connecting floor mat and the extension portion of the extended floor mat form a U-shaped once the extended floor mat and the connecting floor mat interlock.

In some configurations, a drain is formed in the floor portion of the extended floor mat.

In some configurations, the drain is formed in a lowest point of the floor portion of the extended floor mat.

In some configurations, a cap is configured to plug an opening of the drain.

In another form, a floor mat assembly is configured to at least partially cover a floor of a vehicle. The floor mat assembly includes an extended floor mat and a connecting floor mat. The extended floor mat includes a floor portion, an extension portion, and an interlocking portion. The extension portion extends from a periphery of the floor portion. The interlocking portion extends from a periphery of the extension portion and includes a plurality of tabs and at least one locking member. The connecting floor mat includes a front wall, a back wall, and side walls that extend upward from a bottom surface thereof. One side wall has a plurality of pockets and at least one recess formed therein. The extended floor mat and the connecting floor mat interlock when the plurality of tabs of the interlocking portion are received in the plurality of pockets formed in the one side wall of the connecting floor mat and the at least one locking member of the interlocking portion is received in the at least one recess formed in the one side wall of the connecting floor mat to restrict vertical and lateral movement of the extended floor mat and the connecting floor mat relative to each other.

In some configurations, the at least one locking member of the interlocking portion is disposed between a pair of tabs of the plurality of tabs.

In some configurations, the at least one recess formed in the one side wall is disposed between a pair of pockets of the plurality of pockets.

In some configurations, each tab of the plurality of tabs is movable independently of each other and the at least one locking member.

In some configurations, the extension portion of the extended floor mat is U-shaped.

In some configurations, the at least one recess formed in the one side wall of the connecting floor mat is T-shaped.

In some configurations, a plurality of gripping elements extend upward from surfaces of the floor portion and the extension portion of the extended floor mat.

In yet another form, a floor mat is configured to at least partially cover a floor of a vehicle and includes a floor portion and a floor drain. The floor drain is formed in the floor portion of the floor mat and configured to be press-fitted into a drain hole formed in the vehicle. The floor drain having a rib that snaps into engagement with the vehicle once the floor drain is press-fitted into the drain hole to secure the floor drain to the vehicle. Fluids connected on the floor portion of the floor mar are directed toward the floor drain once the floor drain is press-fitted into the drain hole formed in the vehicle.

In some configurations, the floor drain is formed at a lowest point of the floor portion.

In some configurations, the floor drain is formed at a rearward part of the floor portion.

In some configurations, the floor drain includes a primary body that is received in the drain hole formed in the vehicle once the floor drain is press-fitted in the drain hole.

In some configurations, the floor drain includes a secondary body. A portion of the secondary body is received in the drain hole formed in the vehicle while another portion of the secondary body extends past the vehicle once the floor drain is press-fitted in the drain hole.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
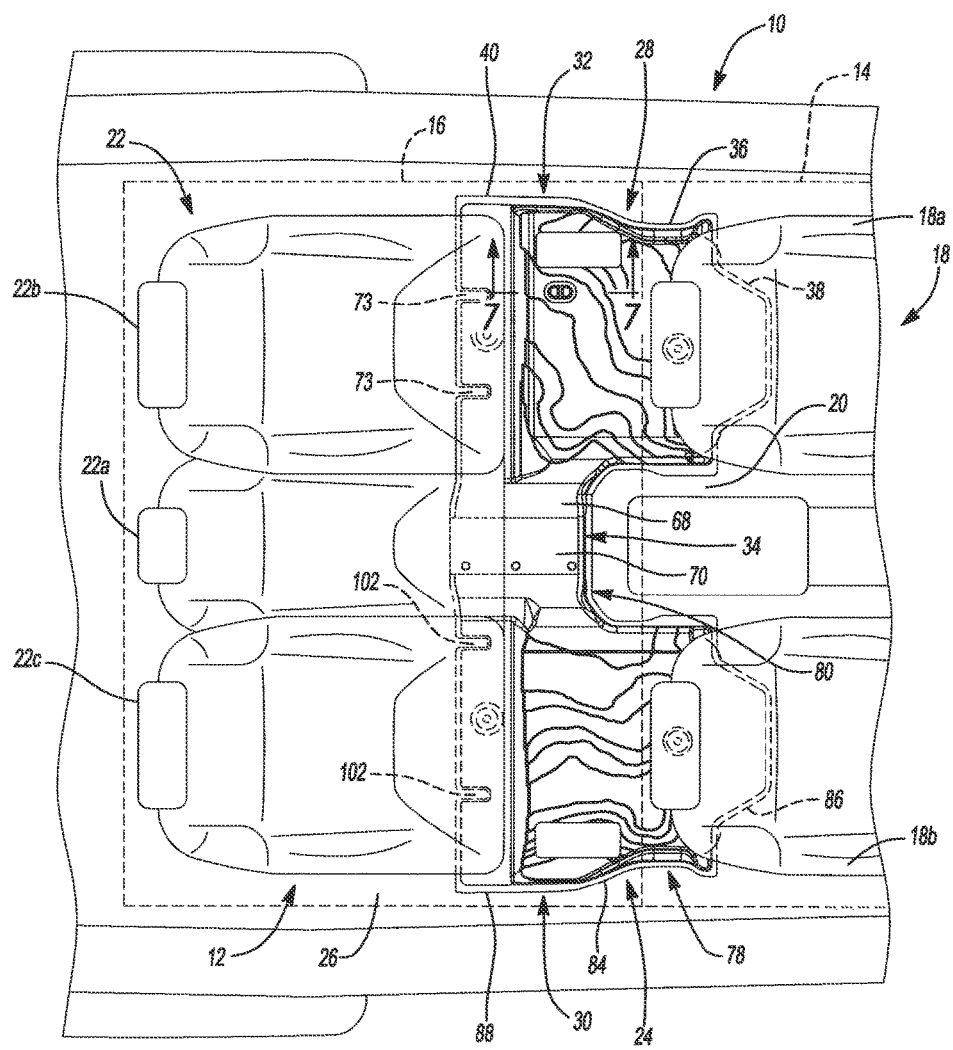
FIG. 1 is a top view of a floor mat assembly disposed on a floor of a vehicle according to the principles of the present disclosure.
Figure 3:
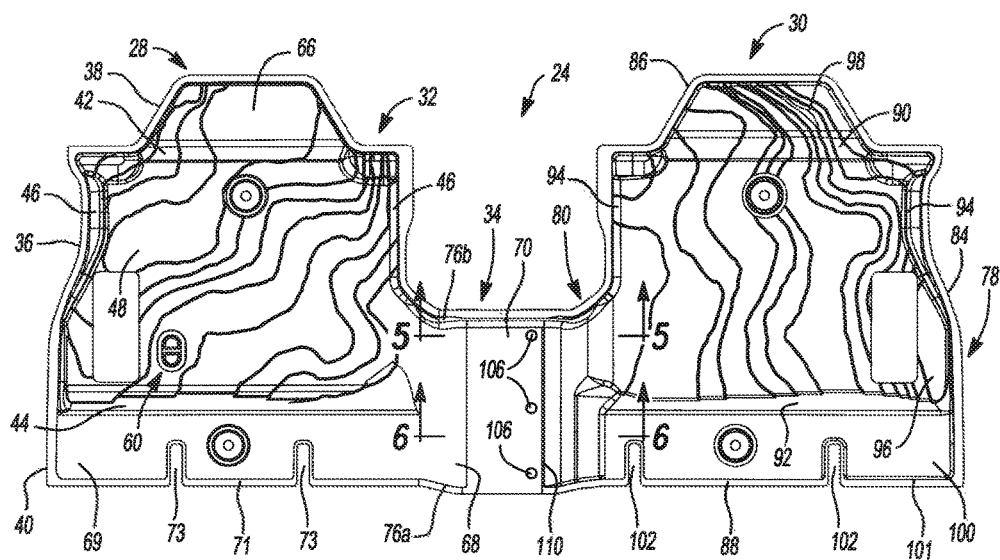
FIG. 3 is a top view of the floor mat assembly of FIG. 1 in an interlock state.
Figure 4:
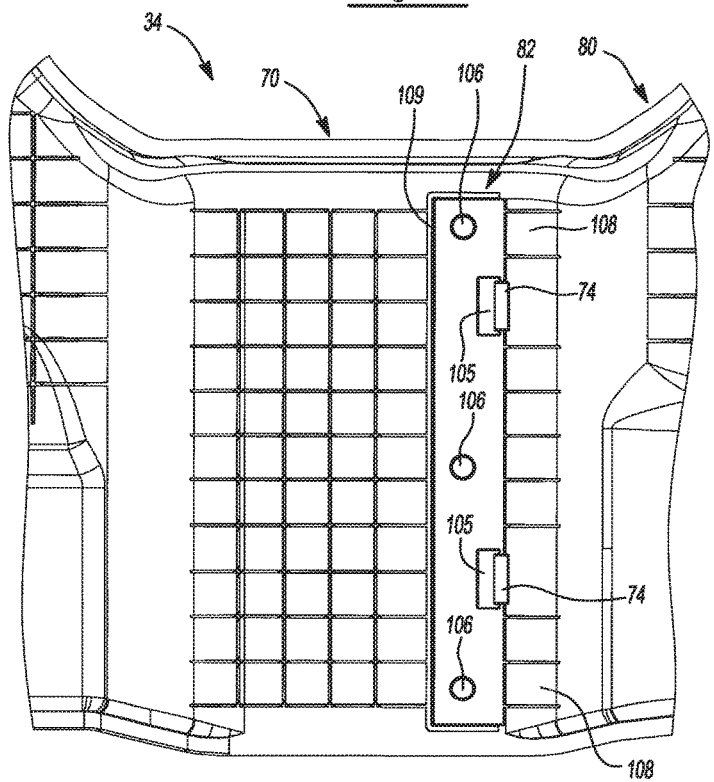
FIG. 4 is a bottom view of a portion of the floor mat assembly of FIG. 1 in an interlock state.
Figure 5:
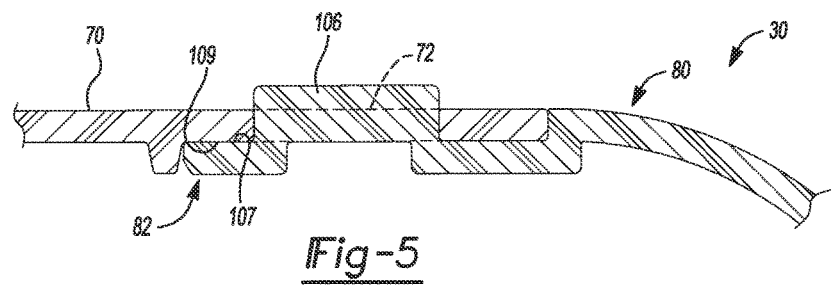
Figure 6:
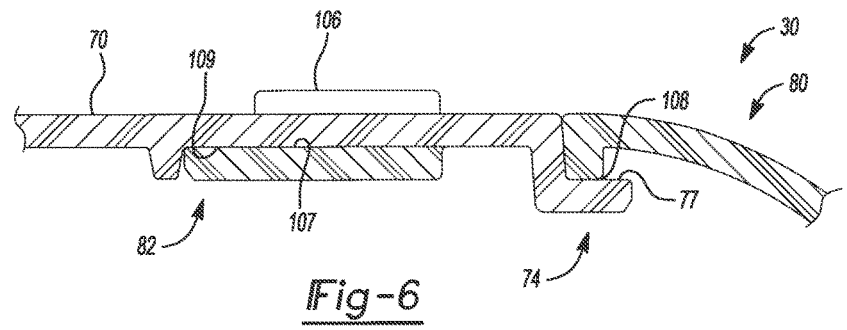
Figure 7:
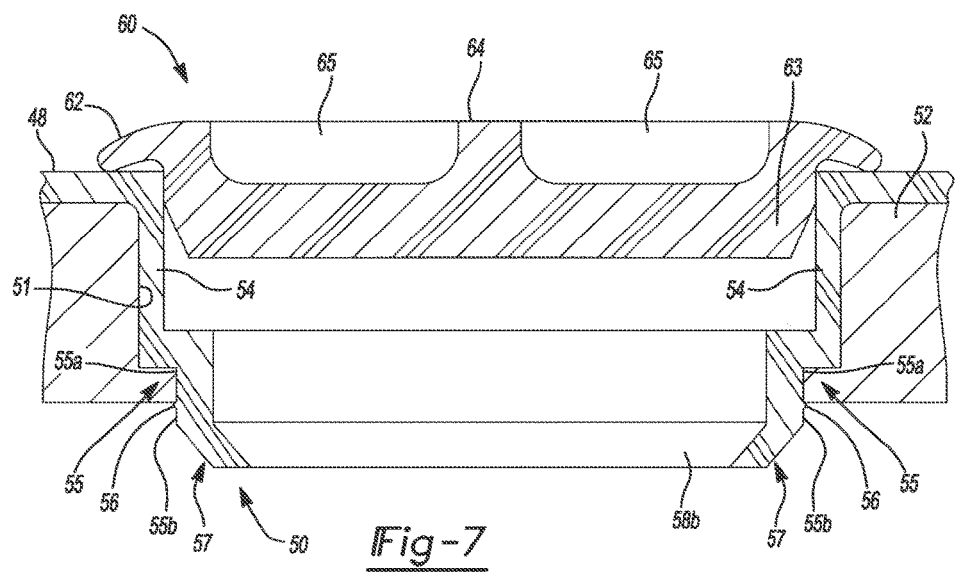
Figure 8:
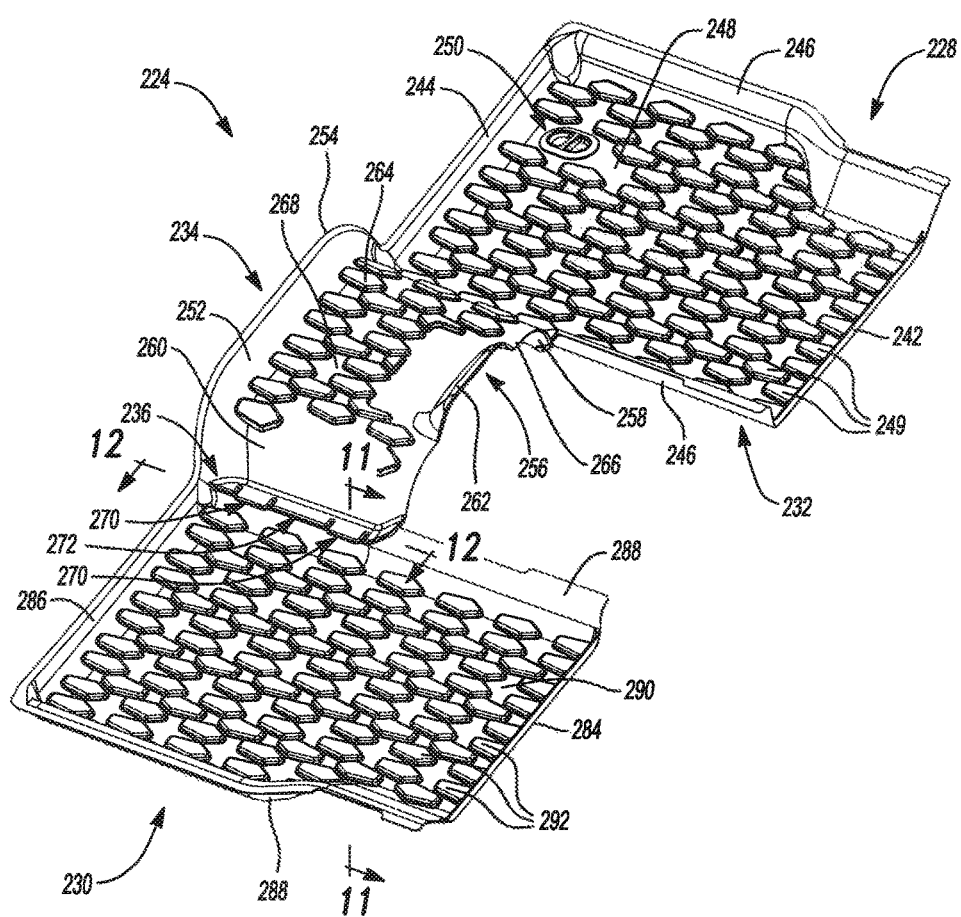
Figure 9:
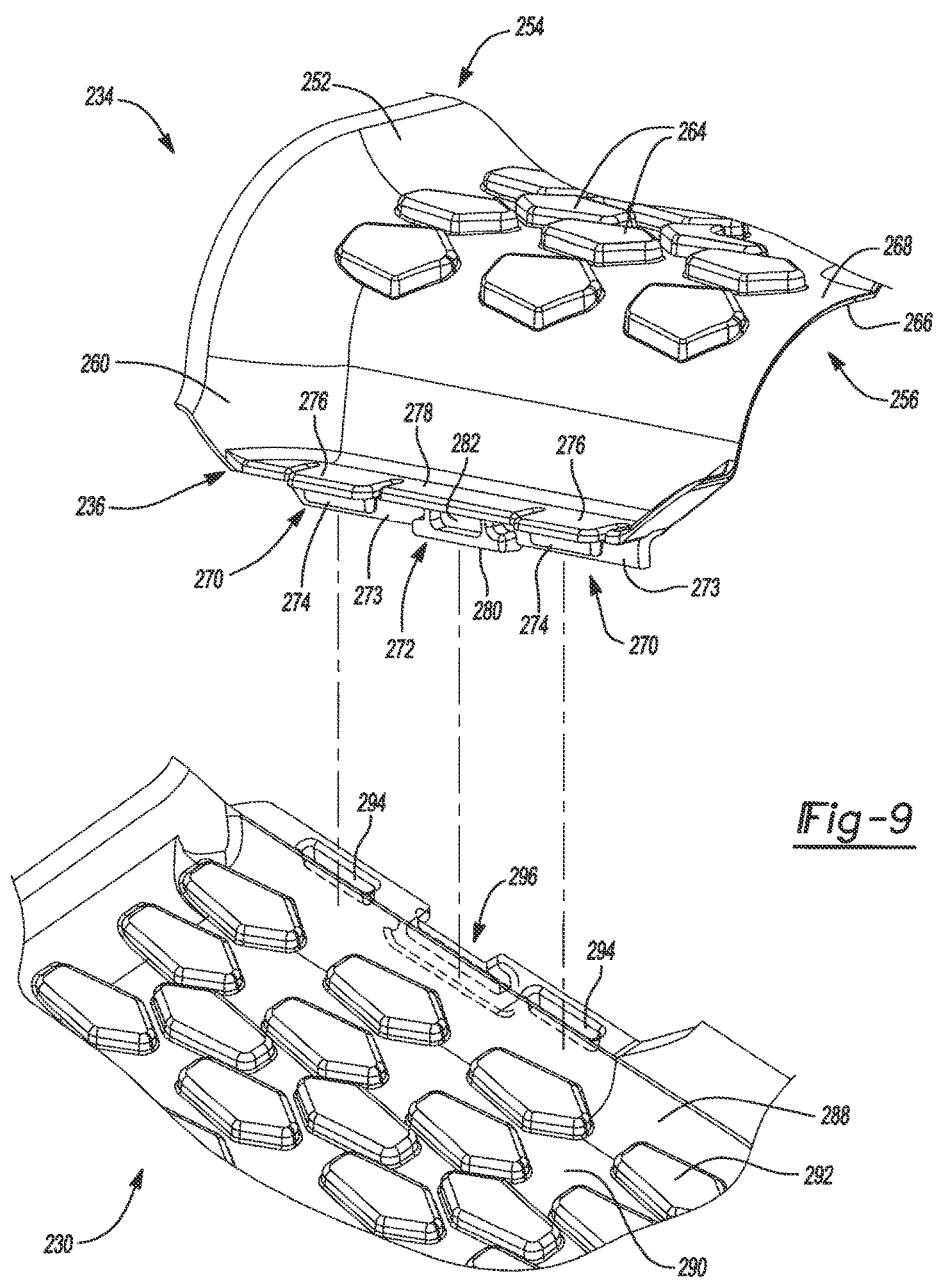
Figure 10:
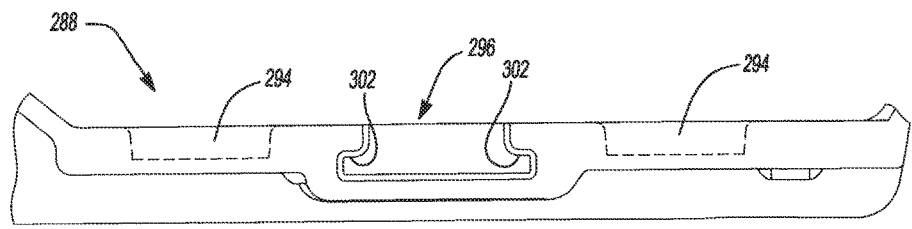
Figure 11:
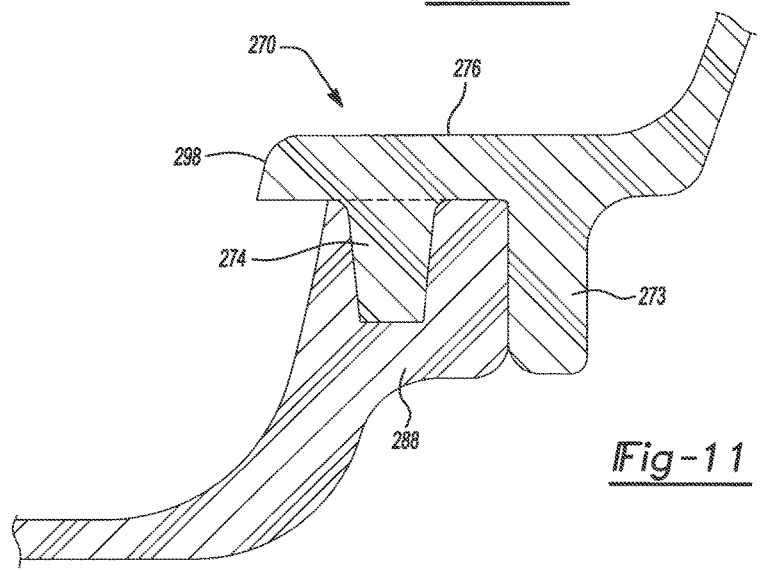
Figure 12:
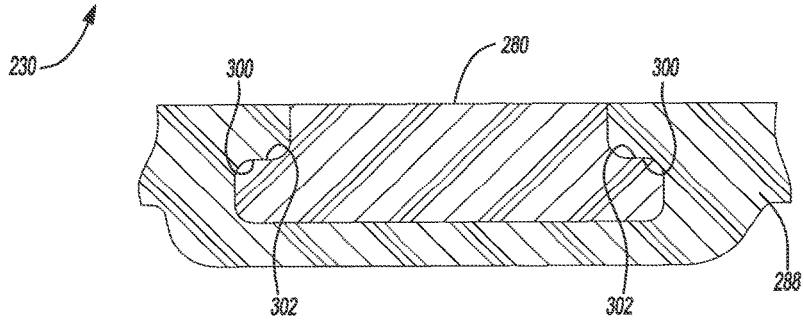

FIG. 5 a cross-sectional view of the floor mat assembly taken along line 5-5 of FIG. 3;

FIG. 6 is a cross-sectional view of the floor mat assembly taken along line 6-6 of FIG. 3;

FIG. 7 is a cross-sectional view of the floor mat assembly taken along line 7-7 of FIG. 1;

FIG. 8 is a perspective view of an alternate floor mat assembly in an interlock state;

FIG. 9 is an exploded view of a portion of the floor mat assembly of FIG. 8;

FIG. 10 is a side view of a portion of a connecting floor mat of the floor mat assembly of FIG. 8;

FIG. 11 is a cross-sectional view of the floor mat assembly taken along line 11-11 of FIG. 8; and FIG. 12 is a cross-sectional view of a portion of the floor mat assembly taken along line 12-12 of FIG. 8.

Corresponding reference numerals indicate corresponding parts throughout the several views of the drawings.

DETAILED DESCRIPTION

Example embodiments will now be described more fully with reference to the accompanying drawings.

With reference to FIG. 1, a vehicle 10 having an occupancy compartment 12 is provided. The occupancy compartment 12 includes at least a front row 14 and a rear row 16. A driver seat 18a and a passenger seat 18b (together known as a front seat assembly 18) are disposed in the front row 14 of the occupancy compartment 12. An arm rest compartment 20 is disposed in the front row 14 of the occupancy compartment 12 between the driver seat 18a and the passenger seat 18b, and partially extends into the rear row 16 of the occupancy compartment 12. A rear seat assembly 22 is disposed in the rear row 16 of the occupancy compartment 12 and includes a middle seat 22a positioned between left and right seats 22b, 22c.

As shown in FIG. 1, a floor mat assembly 24 is substantially disposed in the rear row 16 of the occupancy compartment 12 on a vehicle floor 26 of the vehicle 10, and partially extends into the front row 14 of the occupancy compartment 12. The floor mat assembly 24 is also disposed between the front seat assembly 18 and the rear seat assembly 22 and substantially extends the width of the occupancy compartment 12. The floor mat assembly 24 includes an extended floor mat 28 disposed at a left side of the rear row 16 and a connecting floor mat 30 disposed at a right side of the rear row 16. As will be described in more detail below, the extended floor mat 28 and the connecting floor mat 30 interlock to restrict vertical and lateral movement relative to each other.

Figure 2:
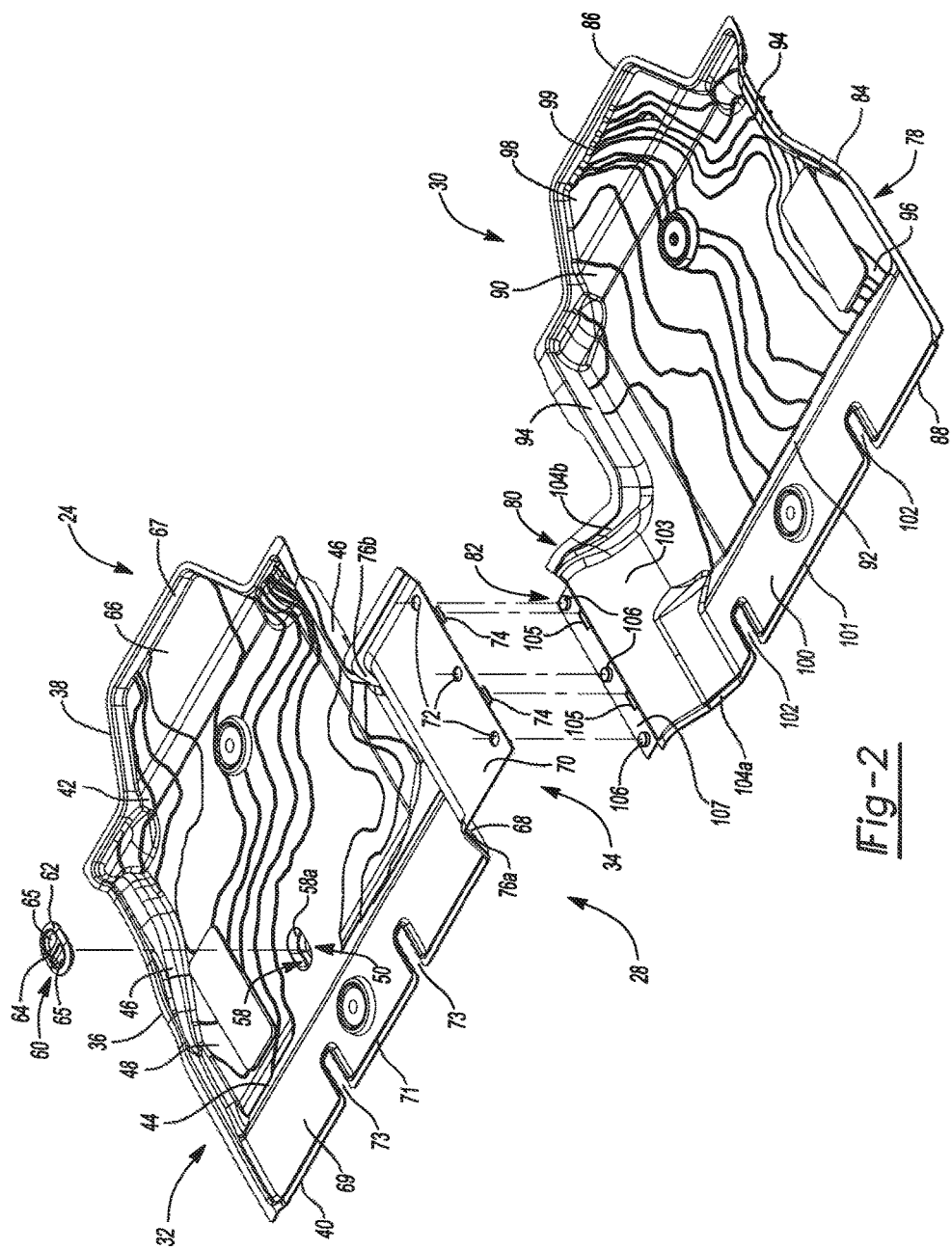
FIG. 2 is an exploded view of the floor mat assembly of FIG. 1.

With reference to FIGS. 1-7, the extended floor mat 28 is substantially rectangular-shaped and is made out of a copolymer material (e.g., thermoplastic elastomer). It should be understood that although the extended floor mat 28 in the present disclosure is substantially rectangular-shaped, the extended floor mat 28 can be any other suitable shape depending on the configuration of the vehicle floor 26. The extended floor mat 28 is formed from a molding process (e.g., injection molding) and includes a floor portion 32 and an extension portion 34 (FIGS. 1-3). The floor portion 32 includes design features that accommodate floor configurations of vehicles that the extended floor mat 28 is disposed therein. For example, in the embodiment illustrated herein, the floor portion 32 includes an intermediate section 36, a front section 38, and a rear section 40 (FIGS. 1-3). As shown in FIGS. 2 and 3, the intermediate section 36 defines a front slope wall 42, a rear sloped wall 44, and side walls 46 that extend upward from a bottom surface 48 and cooperate along with the extension portion 34 to prevent debris and fluids on the bottom surface 48 from spilling on to the vehicle floor 26. The bottom surface 48 also includes an oval-shaped floor drain 50 (FIG. 2) formed therethrough that allows fluid (e.g., liquid) collected in the floor portion 32 to drain therefrom without removing the extended floor mat 28 from the vehicle floor 26.

The floor drain 50 is formed at a lowest, rearward point of the bottom surface 48 of the intermediate section 36 and interfaces with a corresponding oval-shaped drain hole 51 formed in a body 52 of the vehicle 10 once the extended floor mat 28 is disposed on the vehicle floor 26 and the floor drain 50 is press-fitted in the drain hole 51. It should be understood that the structure and function of the floor drain 50 formed in the extended floor mat 28 of the floor mat assembly 24 and interfacing with a corresponding drain hole 51 formed in the body 52 of the vehicle 10 is applicable to single floor mats disposed separately (i.e., non-interlocking) in the right side and/or left side of the rear row 16 or front row 14 of the occupancy compartment 12. As shown in FIG. 7, the floor drain 50 includes a primary body 54, a secondary body 55, a rib 56, and a tapered end 57. The primary body 54 of the floor drain 50 is received in the drain hole 51 of the vehicle 10 once the extended floor mat 28 is disposed on the vehicle floor 26 and the floor drain 50 is press-fitted in the drain hole 51. A portion 55a of the secondary body 55 is received in the drain hole 51 while another portion 55b of the secondary body 55 extends past the body 52 of the vehicle 10 once the extended floor mat 28 is disposed on the vehicle floor 26 and the floor drain 50 is press-fitted in the drain hole 51. The rib 56 extends 360 degrees around the another portion 55b of the secondary body 55 and snaps into engagement with the body 52 of the vehicle 10 once the floor drain 50 is press-fitted in the drain hole 51 so that the floor drain 50 is secured to the body 52 of the vehicle 10. The tapered end 57 extends from the portion 55b of the secondary body 55 away from the vehicle body 52.

An opening 58 having a first end 58a (FIG. 2) and a second end 58b (FIG. 7) extends through the floor drain 50 to allow liquids, for example, to drain from the extended floor mat 28. As shown in FIGS. 2 and 7, a cap 60 having a lip 62 extending around a body 63 and a gripping member 64 between a pair of recesses 65 is provided to plug the first end 58a of the opening 58 when the floor drain 50 is not in use. Once the opening 58 is plugged, the lip 62 contacts the bottom surface 48 of the intermediate section 36 (FIG. 7). It should be understood that the cap 60 may also be used to plug the drain hole 51 in the body 52 of the vehicle 10.

The front section 38 of the floor portion 32 extends from intermediate section 36 toward the front seat assembly 18 (FIG. 1), thereby, expanding the surface area of the floor portion 32. The front section 38 includes a surface 66 positioned above the bottom surface 48 of the intermediate section 36 and a rim 67 extending upward from and around a periphery of the surface 66 (FIG. 2). The surface 66 and the rim 67 cooperate such that debris and fluids collected on the surface 66 of the front section 38 are prevented from spilling on to the vehicle floor 26. Liquids (e.g., water) collected on the surface 66 are directed to the floor drain 50 to be drained therefrom without removing the extended floor mat 28 from the vehicle floor 26.

The rear section 40 of the floor portion 32 extends from the intermediate section 36 toward the rear seat assembly 22 (FIG. 1), thereby, expanding the surface area of the floor portion 32. The rear section 40 includes a surface 69 positioned above the bottom surface 48 of the intermediate section 36 and a rim 71 extending upward from and around a periphery of the surface 69 (FIG. 2). In some embodiments, the vehicle 10 may include a seat support (not shown) extending from the vehicle floor 26. In such embodiment, the rear sloped wall 44 and the rear section 40 of the floor portion 32 cooperate to accommodate the seat support (not shown). The surface 69, the rim 71, and the extension portion 34 cooperate such that debris and fluids collected on the surface 69 of the rear section 40 are prevented from spilling on to the vehicle floor 26. Liquids collected in the rear section 40 are directed to the floor drain 50 to be drained therefrom without removing the extended floor mat 28 from the vehicle floor 26. The rear section 40 also includes grooves 73 (FIGS. 1-3) formed at a periphery thereof to facilitate disposing the extended floor mat 28 on the vehicle floor 26 in which the seat support (not shown) has runner assemblies (not shown), for example, disposed thereon.

As shown in FIGS. 1-3, the extension portion 34 of the extended floor mat 28 extends from a periphery of the floor portion 32 and includes a sloped surface 68 and an interlocking member 70. The sloped surface 68 and the interlocking member 70 accommodate floor configurations of vehicles that the extended floor mat 28 is disposed therein. For example, in the embodiment illustrated herein, the sloped surface 68 extends upward from the floor portion 32 so as to accommodate protuberances (not shown) in the vehicle floor 26. As shown in FIG. 2, an outer rim 76a and an inner rim 76b extend upward from and along the sloped surface 68, and cooperate with the sloped surface 68 to prevent debris and fluids on the sloped surface 68 from spilling on to the vehicle floor 26. Liquids collected on the sloped surface 68 are directed to the floor drain 50 to be drained therefrom without removing the extended floor mat 28 from the vehicle floor 26. With continued reference to FIG. 2, the interlocking member 70 extends parallel to the floor portion 32 and includes a plurality of circular apertures 72 and a plurality of L-shaped tabs 74 at a periphery thereof. The plurality of apertures 72 and the plurality of tabs 74 are positioned such that the apertures 72 and the tabs 74 alternate with respect to each other. The plurality of tabs 74 also extend outwardly from the interlocking member 70 and include a locking surface 77 that locks against the connecting floor mat 30 (FIG. 6).

The connecting floor mat 30 is substantially rectangular-shaped and is made out of a copolymer material (e.g., thermoplastic elastomer). It should be understood that although the connecting floor mat 30 in the present disclosure is substantially rectangular-shaped, the connecting floor mat 30 can be any other suitable shape depending on the configuration of the vehicle floor 26. The connecting floor mat 30 is formed from a molding process (e.g., injection molding) and includes a floor portion 78, an extension portion 80 and an adaptor member 82. The floor portion 78 includes design features that accommodate particular needs of vehicles that the connecting floor mat 30 is disposed therein. For example, in the embodiment illustrated herein, the floor portion 78 includes an intermediate section 84, a front section 86, and a rear section 88 (FIGS. 1-3). The intermediate section 84 defines a front slope wall 90, a rear sloped wall 92, and side walls 94 that extend upward from a bottom surface 96 and cooperate along with the extension portion 80 to prevent debris and fluids on the bottom surface 96 from spilling on to the vehicle floor 26. It should be understood that the bottom surface 96 may also include an oval-shaped drain (not shown) formed therethrough that is similar in function and structure to the floor drain 50 formed in the bottom surface 48 of the extended floor mat 28.

The front section 86 of the floor portion 78 extends from the intermediate section 84 toward the front seat assembly 18, thereby, expanding the surface area of the floor portion 78 (FIG. 1). The front section 86 includes a surface 98 positioned above the bottom surface 96 of the intermediate section 84 and a rim 99 extending upward from and around a periphery of the surface 98 (FIG. 2). The surface 98 and the rim 99 cooperate such that debris and fluids collected on the surface 98 are prevented from spilling on the vehicle floor 26.

The rear section 88 of the floor portion 78 extends from the intermediate section 84 toward the rear seat assembly 22, thereby, expanding the surface area of the floor portion 78 (FIG. 1). The rear section includes a surface 100 positioned above the bottom surface 96 of the intermediate section 84 and a rim 101 extending upward from and around a periphery of the bottom surface 96 (FIG. 2). In some embodiments, the vehicle 10 may include the seat support (not shown) extending from the vehicle floor 26. In such embodiments, the rear sloped wall 92 and the rear section 88 cooperate to accommodate the seat support (not shown). The surface 100, the rim 101, and the extension portion 80 cooperate such that debris and fluids collected on the surface 100 are prevented from spilling on to the vehicle floor 26. The rear section 88 also includes grooves 102 formed at a periphery thereof to facilitate disposing the connecting floor mat 30 in the vehicle in which the seat support (not shown) has runner assemblies (not shown) disposed thereon.

As shown in FIG. 2, the extension portion 80 of the connecting floor mat 30 extends upward from the floor portion 78 to accommodate protuberances (not shown) in the vehicle floor 26, for example. The extension portion 80 also includes a surface 103, an outer rim 104a, and an inner rim 104b that cooperate to prevent debris and fluids on the surface 103 from spilling on to the vehicle floor 26.

With continued reference to FIG. 2, the adaptor member 82 extends from the extension portion 80 parallel to the floor portion 78. The adaptor member 82 includes a plurality of rectangular-shaped apertures 105 extending therethrough and a plurality of circular protrusions 106 protruding from a surface 107 thereof. The plurality of apertures 105 and the plurality of circular protrusions 106 are positioned such that the apertures 105 and the protrusions 106 alternate with respect to each other. Each tab 74 of the interlocking member 70 extends through a corresponding aperture 105 such that the locking surface 77 of the tab 74 locks against a bottom surface 108 of the extension portion 80 of the connecting floor mat 30 (FIG. 6) and the surface 107 of the adaptor member 82 locks against a bottom surface 109 of the interlocking member 70 (FIGS. 4-6), thereby, restricting vertical movement of the extended floor mat 28 and the connecting floor mat 30 relative to each other. Additionally, each protrusion 106 extends through a corresponding aperture 72 of the interlocking member 70 (FIGS. 1, 3, and 5) to restrict lateral movement of the extended floor mat 28 and the connecting floor mat 30 relative to each other.

With continued reference to FIGS. 1-7, installation and removal of the floor mat assembly 24 into and from the vehicle 10 will be described in detail. A user (not shown) removes a perforated floor section (not shown) that covers the drain hole 51 formed in the body 52 of the vehicle 10 and disposes the extended floor mat 28 on the vehicle floor 26 at the left side of the rear row 16 (FIG. 1) so that the floor drain 50 and the drain hole 51 interface once the floor drain 50 is press fitted, and the rib 56 snaps into engagement with the body 52 of the vehicle 10 (FIG. 7). This interface between the floor drain 50 and drain hole 51 allows fluids (e.g., liquid) collected in the floor portion 32 to drain therefrom without removing the extended floor mat 28 from the vehicle floor 26.

The connecting floor mat 30 is disposed on the vehicle floor 26 at the right side of the rear row 16 (FIG. 1). The user interlocks the connecting floor mat 30 and the extended floor mat 28 such that each protrusion 106 extends through the corresponding aperture 72 of the interlocking member 70 (FIGS. 1, 3, and 5) and each tab 74 of the interlocking member 70 extends through a corresponding aperture 105 of the adaptor member 82 (FIG. 4), thereby, restricting vertical and lateral movement of the extended floor mat 28 and the connecting floor mat 30 relative to each other. A seam 110 in the floor mat assembly 24 is formed once the extended floor 28 and the connecting floor mat 30 are interlocked (FIG. 3).

When the user wishes to remove the floor mat assembly 24 from the vehicle 10 (e.g., for cleaning), the user disconnects the extended floor mat 28 and the connecting floor mat 30 and removes each floor mat 28, 30 out of the vehicle 10 separately. In this way, the user conveniently removes the floor may assembly 24 from the vehicle 10 and avoids inadvertently spilling debris and fluids thereon in the vehicle 10. Additionally, the seam 110 is positioned in an area in which fluids and debris on the interlocking member 70 are less likely to spill on the vehicle floor 26 when the extended floor mat 28 and the connecting floor mat 30 are disconnected from each other and removed from the vehicle 10.

It should be understood that the floor mat assembly 24 in the present disclosure reduces shipping cost as the extended floor mat 28 and the connecting floor mat 30 can be stacked on top of each other, for example, during shipping, thereby, reducing packaging material necessary to ship the floor mat assembly 24.

With reference to FIGS. 8-12, another floor mat assembly 224 is provided. The floor mat assembly 224 may be disposed in the vehicle 10 in a similar manner as the floor mat assembly 24, described above. The structure and function of the floor mat assembly 224 may be similar or identical to the floor mat assembly 24, apart from any exceptions described below.

As shown in FIG. 8, the floor mat assembly 224 includes an extended floor mat 228 and a connecting floor mat 230. The extended floor mat 228 is made out of a copolymer material (e.g., thermoplastic elastomer). The extended floor mat 228 is also formed from a molding process (e.g., injection molding) and includes a floor portion 232, an extension portion 234, and an interlocking portion 236. The floor portion 232 is substantially rectangular-shaped and includes a front wall 242, a rear wall 244, and side walls 246 that extend upward from a bottom surface 248 and cooperate along with the extension portion 234 to prevent debris and fluids on the bottom surface 248 from spilling on to a vehicle floor (not shown). It should be understood that although the extended floor mat 228 in the present disclosure is substantially rectangular-shaped, the extended floor mat 228 can be any other suitable shape depending on the configuration of the vehicle floor 26. The bottom surface 248 includes a plurality of pentagonal-shaped gripping members 249 that extend upward therefrom and an oval-shaped drain (not shown) formed therethrough. The gripping members 249 facilitate grip with a vehicle occupant's feet (not shown) and also creates a raised surface that the vehicle occupant's feet rests on to keep it out of the liquids and debris collected on the bottom surface 248 of the extended floor mat 228. The structure and function of the drain (not shown) may be similar or identical to the floor drain 50 of floor mat assembly 24. A cap 250 having similar structure and function as cap 60, described above, plugs the drain (not shown).

With continued reference to FIG. 8, the extension portion 234 extends from a periphery of the floor portion 232 and includes a rim 252 extending along a back side 254 thereof. The extension portion 234 also includes a first section 256, a second section 258, and a third section 260 that define a generally U-shape. The first section 256 is parallel to the bottom surface 248 and includes a lip 262 and a plurality of pentagonal-shaped gripping elements 264. The lip 262 is disposed at a front side 266 of the first section 256 and accommodates contours in the vehicle floor 26. The plurality of gripping elements 264 extend upward from a surface 268 of the first section 256. The second and third sections 258,260 are parallel to each other and perpendicular to the first section 256.

As shown in FIG. 9, the interlocking portion 236 extends from a periphery of the third section 260 and includes a plurality of flexible lateral locking tabs 270, at least one vertical locking tab or locking member 272, and abutment walls 273. Each flexible lateral locking tab 270 is independently movable with respect to each other and the at least one vertical locking tab 272, and includes a protrusion 274 protruding downwardly from a platform 276 (FIGS. 9 and 11). The at least one vertical locking tab 272 is disposed between a pair of flexible lateral locking tabs 270 (FIG. 9) of the plurality of lateral locking tabs 270 As shown in FIG. 9, the at least one vertical locking tab 272 includes a platform 278 and a T-shaped protrusion 280. The protrusion 280 is disposed below the platform 278 and between a pair of abutment walls 273. The protrusion 280 also includes an oval shaped groove 282 formed therein.

The connecting floor mat 230 is made out of a copolymer material (e.g., thermoplastic elastomer), and is also formed from a molding process (e.g., injection molding). As shown in FIG. 8, the connecting floor mat 230 is substantially rectangular-shaped and includes a front wall 284, a rear wall 286, and side walls 288 that extend upward from a bottom surface 290 and cooperate along with the extension portion 234 to prevent debris and fluids on the bottom surface 290 from spilling on to the vehicle floor (not shown). It should be understood that although the connecting floor mat 230 in the present disclosure is substantially rectangular-shaped, the connecting floor mat 230 can be any other suitable shape depending on the configuration of the vehicle floor 26. The bottom surface 290 includes a plurality of pentagonal-shaped gripping members 292 that extend upward therefrom (FIGS. 8 and 9). A plurality of oval-shaped pockets 294 and at least one T-shaped recess 296 are formed in one side wall 288 of the connecting floor mat 230 (FIGS. 9 and 10).

With reference to FIG. 11, each pocket 294 receives a corresponding protrusion 274 of the flexible lateral locking tab 270 such that the one side wall 288 abuts against the abutment walls 273 and an end 298 of the platform 276 of the flexible lateral locking tab 270 extends past the one side wall 288, thereby, restricting lateral movement of the extended floor mat 228 and the connecting floor mat 230 relative to each other. The recess 296 is positioned between a pair of pockets 294 of the plurality of pockets 294 (FIGS. 9 and 10). With reference to FIG. 12, the recess 296 receives the protrusion 280 of the at least one vertical locking tab 272 such that ends 300 of the protrusion 280 abut against ends 302 of the recess 296, thereby, restricting vertical movement of the extended floor mat 228 and the connecting floor mat 230 relative to each other.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A floor mat assembly configured to at least partially cover a floor of a vehicle, the floor mat assembly comprising:

an extended floor mat including a floor portion and an extension portion, the extension portion extending from the floor portion and including a plurality of apertures and a plurality of tabs at a periphery thereof, the plurality of tabs extending outwardly from the extension portion;

a connecting floor mat including a floor portion, an extension portion and an adaptor member, the extension portion extending from the floor portion, the adaptor member extending from the extension portion and including a plurality of apertures and protrusions extending therefrom, wherein the extended floor mat and the connecting floor mat interlock when the plurality of tabs of the extension portion of the extended floor mat extend through the plurality of apertures of the adaptor member and the protrusions of the adaptor member extend through the plurality of apertures of the extension portion of the extended floor mat to restrict vertical and lateral movement of the extended floor mat and the connecting floor mat relative to each other.

2. The floor mat assembly of claim 1, wherein the plurality of apertures and the plurality of tabs of the extension portion of the extended floor mat alternate relative to each other.

3. The floor mat assembly of claim 2, wherein the plurality of apertures and the protrusions of the adaptor member alternate relative to each other.

4. The floor mat assembly of claim 3, wherein the extension portion of the extended floor mat extends upward from the floor portion of the extended floor mat, and wherein the extension portion of the connecting floor mat extends upward from the floor portion of the connecting floor mat.

5. The floor mat assembly of claim 4, wherein the plurality of tabs of the extended floor mat lock against the extension portion of the connecting floor mat once the extended floor mat and the connecting floor mat interlock to restrict vertical movement relative to each other.

6. The floor mat assembly of claim 5, wherein the adaptor member of the connecting floor mat locks against the extension portion of the extended floor mat once the extended floor mat and the connecting floor mat interlock to restrict vertical movement relative to each other.

7. The floor mat assembly of claim 6, wherein the extension portion of the connecting floor mat and the extension portion of the extended floor mat form a U-shape once the extended floor mat and the connecting floor mat interlock.

8. The floor mat assembly of claim 7, further comprising a drain formed in the floor portion of the extended floor mat.

* * * * *